United States Patent [19]

Richter et al.

[11] 3,901,917

[45] Aug. 26, 1975

[54] N-THIENYLALKYLACETANILIDES

[75] Inventors: Sidney B. Richter, Chicago; John Krenzer, Oak Park, both of Ill.

[73] Assignee: Velsicol Chemical Corporation, Chicago, Ill.

[22] Filed: Nov. 4, 1974

[21] Appl. No.: 520,391

[52] U.S. Cl................................ 260/329 AM; 71/90
[51] Int. Cl.²........................................ C07D 333/00
[58] Field of Search............................ 260/329 AM

[56] References Cited
UNITED STATES PATENTS

| | | | |
|---|---|---|---|
| 2,556,566 | 6/1951 | Weston | 260/329 |
| 2,629,720 | 2/1953 | Kyrides | 260/329 |

Primary Examiner—Bernard Helfin
Assistant Examiner—A. Siegel
Attorney, Agent, or Firm—Robert J. Schwarz; Dietmar H. Olesch

[57] ABSTRACT

This invention discloses new compounds of the formula

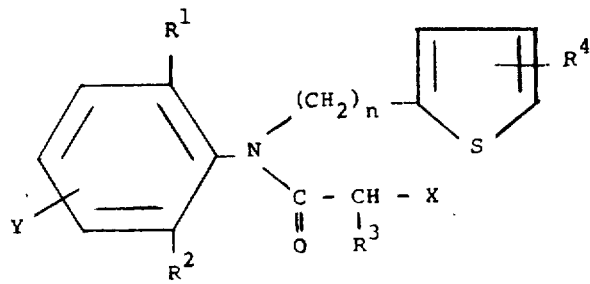

wherein $R^1$ is lower alkyl; $R^2$ is selected from the group consisting of hydrogen, lower alkyl and lower alkoxy; Y is selected from the group consisting of hydrogen, lower alkyl and halogen; $R^3$ and $R^4$ are independently selected from the group consisting of hydrogen and lower alkyl; n is the integer 1 or 2; and X is halogen. The compounds of the above description are useful as herbicides.

6 Claims, No Drawings

N-THIENYLALKYLACETANILIDES

This invention relates to new compositions of matter and more specifically relates to new compounds of the formula

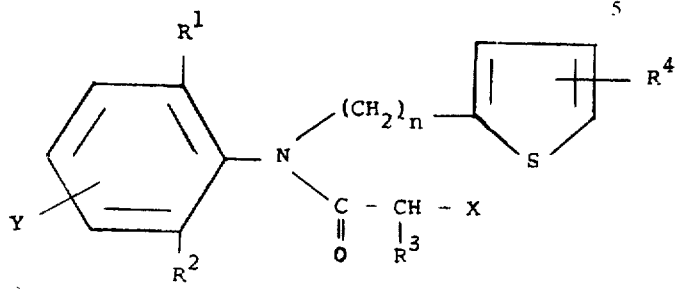

(I)

wherein $R^1$ is lower alkyl; $R^2$ is selected from the group consisting of hydrogen, lower alkyl and lower alkoxy; Y is selected from the group consisting of hydrogen, lower alkyl and halogen; $R^3$ and $R^4$ are independently selected from the group consisting of hydrogen and lower alkyl; n is the integer 1 or 2; and X is halogen.

The term lower as used herein designates a straight or branched carbon chain of up to 4 carbon atoms.

In a preferred embodiment of the present invention Y, $R^3$ and $R^4$ are hydrogen and X is chlorine or bromine.

The compounds of the present invention are useful as herbicides and are particularly useful for controlling the growth of grassy weeds.

The compounds of the present invention can be prepared from a compound of the formula

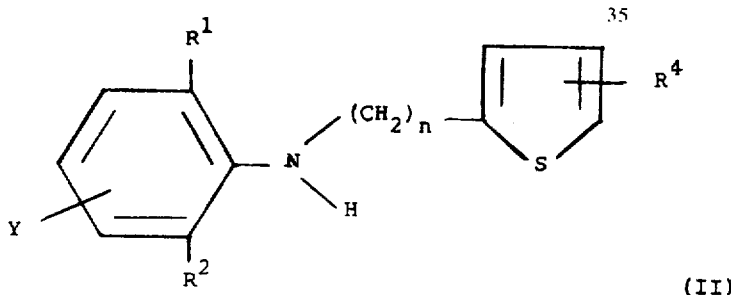

(II)

wherein $R^1$, $R^2$, Y, $R^4$ and n are as heretofore described, by reaction with an α-haloalkanoyl chloride of the formula

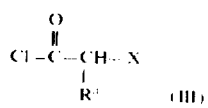

(III)

wherein $R^3$ and X are as heretofore described. This reaction can be conveniently effected by combining a compound of formula II with a compound of formula III in an inert organic reaction medium and in the presence of an acid acceptor such as an alkali metal carbonate or bicarbonate. The compound of formula III can be added to a solution of the compound of formula II which also contains the acid acceptor and a small amount of water at a temperature of from about 0° to about 10°C. After the addition is completed the reaction mixture can be stirred for a period of about 1 hour to ensure completion of the reaction. After this time the reaction mixture can be washed with water to remove inorganic salts and then stripped of solvent to yield the desired product. This product can be used as such or can be further purified by conventional means.

The compounds of formula II can be prepared by hydrogenating the nitrogen-carbon double bond of a compound of the formula

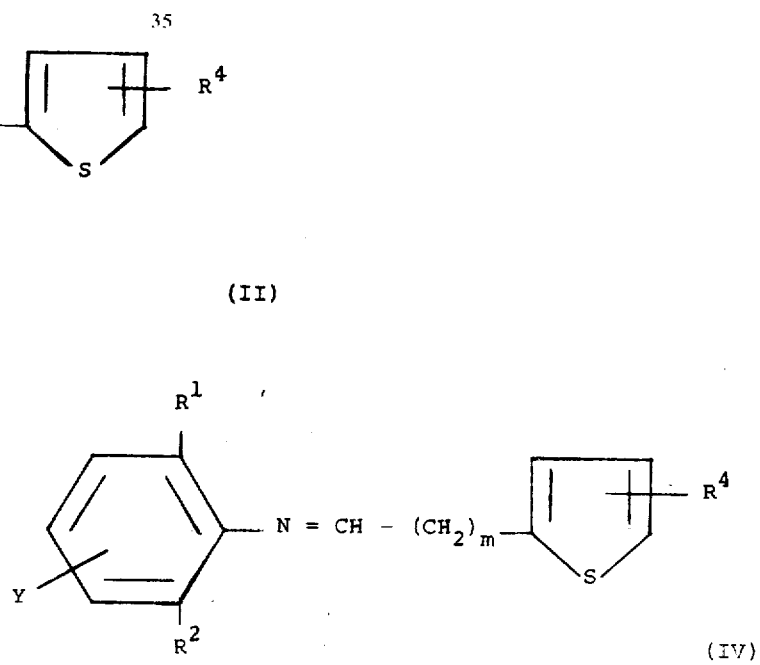

(IV)

wherein m is the integer 0 or 1 and $R^1$, $R^2$ and $R^4$ are as heretofore described, with lithium aluminum hydride. This reaction can be effected by adding the lithium aluminum hydride to a solution of the compound of formula IV in an organic solvent such as ether and heating the resulting reaction medium at temperatures of up to the reflux temperature of the mixture for a period of from 15 minutes to about 6 hours. After this time methanol and water can be added to the reaction mixture followed by filtration of the mixture to remove inorganic salts. The reaction mixture can then be washed with water or with aqueous sodium carbonate, dried and stripped of solvent to yield the desired product.

The above hydrogenation can also be effected by utilizing hydrogen gas in the presence of an appropriate catalyst such as platinum and palladium. This reaction can be carried out at ambient temperatures and at pressures ranging from atmospheric pressure to about 100 pounds per square inch.

The compounds of formula IV, when not available, can be prepared by reacting about equimolar amounts of a compound of the formula

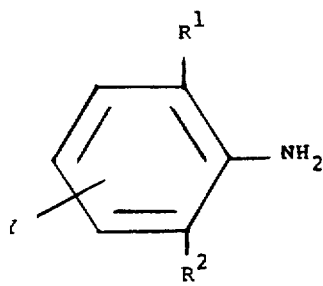

(V)

wherein $R^1$, $R^2$ and Y are as heretofore described, and a compound of the formula

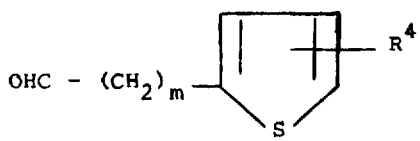

(VI)

wherein m is the integer 0 or 1 and $R^4$ is as heretofore described.

This reaction can be effected by combining the compounds of formulae V and VI in an inert organic solvent such as benzene and heating the mixture at a temperature of up to the reflux temperature of the mixture for a period of from about 4 to about 96 hours. After this time the desired product can be recovered upon evaporation of the solvent used.

Exemplary compounds of formula VI useful for preparing the compounds of the present invention are 2-thiophenecarboxaldehyde, 4-methyl-2-thiophenecarboxaldehyde, 3-ethyl-2-thiophenecarboxaldehyde, 4-isopropyl-2-thiophenecarboxaldehyde, 4-hexyl-2-thiophenecarboxaldehyde, α-(4-methylthien-2-yl)acetaldehyde, α-(3-ethylthien-2-yl)acetaldehyde and the like.

Exemplary compounds of formula V are 2-methylaniline, 2-ethylaniline, 2-propylaniline, 2-butylaniline, 2,6-dimethylaniline, 2,6-diethylaniline, 2,6-dipropylaniline, 2,6-dibutylaniline, 2-methyl-6-methoxyaniline, 2-ethyl-6-methoxyaniline, 2-butyl-6-butoxyaniline, 2-methyl-4-chloroaniline, 2-methyl-4-bromoaniline, 2-methyl-4-fluoroaniline, 2,6-dimethyl-4-chloroaniline, 2,4,6-trimethylaniline and the like.

Exemplary compounds of formula III useful for preparing the compounds of the present invention are α-chloroacetyl chloride, α-bromoacetyl chloride, α-chloropropionyl chloride, α-bromopropionyl chloride, α-chlorobutanoyl chloride, α-chloropentanoyl chloride and the like.

The manner in which the compounds of the present invention can be prepared is more specifically illustrated in the following examples.

EXAMPLE 1

Preparation of N-2-Thenylidine-2,6-dimethylaniline 2,6-dimethylaniline (36 grams), 2-thiophenecarboxaldehyde (33 grams), and toluene (100 ml) were charged into a glass reaction vessel equipped with a mechanical stirrer, thermometer and reflux condenser. The reaction mixture was then heated at reflux, with stirring for a period of about 48 hours. After this time the reaction mixture is distilled to yield the desired product N-2-thenylidine-2,6-dimethylaniline having a boiling point of 128° to 129°C at 0.6 mm of Hg pressure.

EXAMPLE 2

Preparation of N-(2-Thienylmethylene)-2,6-dimethylaniline

N-2-Thenylidine-2,6-dimethylaniline (36 grams), ether (400 ml) and lithium aluminum hydride (3.0 grams) were charged into a glass reaction vessel equipped with a mechanical stirrer, thermometer and reflux condenser. The resulting mixture was stirred and heated at reflux for a period of about 4 hours. After this time methanol (100 ml) and water (100 ml) were added and the resulting mixture was filtered. The filtrate was then washed with aqueous sodium bicarbonate and was dried over anhydrous magnesium sulfate. The dried solution is stripped of solvent to yield the desired product N-(2-thienylmethylene)-2,6-dimethylaniline having a boiling point of 121° to 123°C at 0.6 mm of Hg pressure.

EXAMPLE 3

Preparation of N-(2-Thienylmethylene)-2,6-dimethyl-α-chloroacetanilide

N-2-Thienylmethylene)-2,6-dimethylaniline (15.0 grams), sodium bicarbonate (15 grams), pentane (30 ml) and water (100 ml) were charged into a glass reaction vessel equipped with a thermometer and mechanical stirrer. The mixture was cooled to about 0°C and chloroacetyl chloride (8.0 grams) was incrementally added thereto. After the addition was completed the reaction mixture was stirred for a period of about 1 hour and allowed to warm up to room temperature. The solid product which formed was then recovered by filtration and was recrystallized from heptane to yield the desired product N-(2-thienylmethylene)-2,6-dimethyl-α-chloroacetanilide having a melting point of 107° to 109°C.

EXAMPLE 4

Preparation of N-2-Thenylidine-2,6-diethylaniline 2,6-Diethylaniline (15 grams), 2-thiophenecarboxaldehyde (11 grams) and toluene (50 ml) were charged into a glass reaction vessel equipped with a mechanical stirrer, thermometer and reflux condenser. The reaction mixture was then heated at reflux with stirring for a period of about 48 hours. After this time the reaction mixture was distilled to yield the desired product N-2-thenylidine-2,6-diethylaniline having a boiling point of 132° to 133°C at 0.6 mm of Hg pressure.

EXAMPLE 5

Preparation of N-(2-Thienylmethylene)-2,6-diethylaniline

2-Thenylidine-2,6-diethylaniline (23.2 grams), ether (300 ml) and lithium aluminum hydride (2.0 grams) were charged into a glass reaction vessel equipped with a mechanical stirrer and thermometer. The resulting mixture was stirred at ambient temperature for a period of about 16 hours. After this time methanol (10 ml) and water (10 ml) were added to the reaction mixture with stirring. The mixture was then filtered, dried over anhydrous magnesium sulfate and distilled under reduced pressure to yield the desired product N-(2-thienylmethylene)-2,6-diethylaniline.

EXAMPLE 6

Preparation of N-(2-Thienylmethylene)-2,6-diethyl-α-chloroacetanilide

N-(2-Thienylmethylene)-2,6-diethylaniline (8 grams), ether (50 ml), water (30 ml) and sodium carbonate (4 grams) were charged into a glass reaction vessel equipped with a thermometer and mechanical stirrer. The mixture was cooled to 0°C and chloroacetyl chloride (4 grams) was incrementally added thereto. The reaction mixture was stirred and permitted to warm up to room temperature resulting in the formation of a solid product. This product was recovered by filtration and was recrystallized from hexane to yield the desired product N-(2-thienylmethylene)2,6-diethyl-α-chloroacetanilide having a melt point of 64° to 66°C.

EXAMPLE 7

Preparation of N-2-Thenylidine-2-methyl-5-chloroaniline

2-Methyl-5-chloroaniline (0.3 mole), 2-thiophenecarboxaldehyde (0.3 mol) and benzene (100 ml) are charged into a glass reaction vessel equipped with a mechanical stirrer, thermometer and reflux condenser. The reaction mixture is then heated at reflux, with stirring for a period of about 72 hours. After this time the reaction mixture is distilled to yield the desired product N-2-thenylidine-2-methyl-5-chloroaniline.

EXAMPLE 8

Preparation of N-(2-Thienylmethylene)-2-methyl-5-chloroaniline

N-2-Thenylidine-2-methyl-5-chloroaniline (0.1 mole) dissolved in ether (100 ml) is charged into a glass reaction vessel equipped with a mechanical stirrer, thermometer and reflux condenser. Lithium aluminum hydride (2 grams) is added to the flask and the resulting mixture stirred at room temperature for a period of about 1 hour. The reaction mixture is then heated at reflux, with stirring, for an additional hour. After this time methanol (10 ml) and water (10 ml) are added and the resulting mixture is filtered. The filtrate is then washed with water and is dried over anhydrous magnesium sulfate. The dried solution is stripped of solvent to yield the desired product N-(2-thienylmethylene)-2-methyl-5-chloroaniline.

EXAMPLE 9

Preparation of N-(2-Thienymethylene)-2-methyl-5-α-dichloroacetanilide

N-(2-Thienylmethylene)-2-methyl-5-chloroaniline (0.05 mole), sodium bicarbonate (10 grams), dioxane (25 ml) and water (6 ml) are charged into a glass reaction vessel equipped with a thermometer and mechanical stirrer. The mixture is cooled to about 0°C and chloroacetyl chloride (0.05 mole) is incrementally added thereto. After the addition is completed the reaction mixture is stirred for a period of about 1 hour and allowed to warm up to room temperature. After this time ether (100 ml) is added to the mixture with stirring. The resulting mixture is then washed with water and dried over anhydrous magnesium sulfate. The dried solution is stripped of solvent to yield the desired product N-(2-thienylmethylene)-2-methyl-5-α-dichloroacetanilide.

EXAMPLE 10

Preparation of N-2-Thenylidine-2-methylaniline

2-Methylaniline (0.3 mole), 2-thiophenecarboxaldehyde (0.3 mole) and benzene (100 ml) are charged into a glass reaction vessel equipped with a mechanical stirrer, thermometer and reflux condenser. The reaction mixture is then heated at reflux, with stirring, for a period of about 36 hours. After this time the reaction mixture is distilled to yield the desired product N-2-thenylidine-2-methylaniline.

EXAMPLE 11

Preparation of N-(2-Thienylmethylene)-2-methylaniline

N-2-Thenylidine-2-methylaniline (0.1 mole) dissolved in ether (100 ml) is charged into a glass reaction vessel equipped with a mechanical stirrer, thermometer and reflux condenser. Lithium aluminum hydride (2 grams) is added to the flask and the resulting mixture stirred at room temperature for a period of about 1 hour. The reaction mixture is then heated at reflux, with stirring, for an additional hour. After this time methanol (10 ml) and water (10 ml) are added and the resulting mixture is filtered. The filtrate is then washed with water and is dried over anhydrous magnesium sulfate. The dried solution is stripped of solvent to yield he desired product N-(2-thienylmethylene)-2-methylaniline.

EXAMPLE 12

Preparation of N-(2-Thienylmethylene)-N-α-chloropropionyl-2-methylaniline

N-(2-Thienylmethylene)-2-methylaniline (0.05 mole), sodium bicarbonate (10 grams), dioxane (30 ml) and water (5 ml) are charged into a glass reaction vessel equipped with a thermometer and mechanical stirrer. The mixture is cooled to about 0°C and α-chloropropionyl chloride (0.05 mole) is incrementally added thereto. After the addition is completed the reaction mixture is stirred for a period of about 1 hour and allowed to warm up to room temperature. After this time ether (100 ml) is added to the mixture with stirring. The resulting mixture is then washed with water and dried over anhydrous magnesium sulfate. The dried solution is stripped of solvent to yield the desired product N-(2-thienylmethylene)-N-α-chloropropionyl-2-methylaniline.

EXAMPLE 13

Preparation of N-(2-Thienylethyledene)-2,6-diethylaniline 2,6-Diethylaniline (0.3 mole), α-thien-2-ylacetaldehyde (0.3 mole) and benzene (120 ml) are charged into a glass reaction vessel equipped with a mechanical stirrer, thermometer and reflux condenser. The reaction mixture is then heated at reflux, with stirring, for a period of about 72 hours. After this time the reaction mixture is distilled to yield the desired product N-(2-thienylethyledene)-2,6-diethylaniline.

EXAMPLE 14

Preparation of N-(2-Thienylethyl)-2,6-diethylaniline

N-(2-Thienylethyledene)-2,6-diethylaniline (0.1 mole) dissolved in ether (100 ml) is charged into a glass reaction vessel equipped with a mechanical stirrer, thermometer and reflux condenser. Lithium aluminum hydride (2 grams) is added to the flask and the resulting mixture stirred at room temperature for a period of about 1 hour. The reaction mixture is then heated at reflux, with stirring, for an additional hour. After this time methanol (10 ml) and water (10 ml) are added and the resulting mixture is filtered. The filtrate is then washed with water and is dried over anhydrous magnesium sulfate. The dried solution is stripped of solvent to yield the desired product N-(2-thienylethyl)-2,6-diethylaniline.

EXAMPLE 15

Preparation of N-(2-Thienylethylene)-2,6-diethyl-α-bromoacetanilide

N-(2-Thienylethyl)-2,6-diethylaniline (0.1 mole), sodium bicarbonate (10 grams), dioxane (25 ml) and water (6 ml) are charged into a glass reaction vessel equipped with a thermometer and mechanical stirrer. The mixture is cooled to about 0°C and bromoacetyl chloride (0.05 mole) is incrementally added thereto. After the addition is completed the reaction mixture is stirred for a period of about 1 hour and allowed to warm up to room temperature. After this time ether (100 ml) is added to the mixture with stirring. The resulting mixture is then washed with water and dried over anhydrous magnesium sulfate. The dried solution is stripped of solvent to yield the desired product N-(2-thienylethylene)-2,6-diethyl-α-bromoacetanilide.

Additional exemplary compounds which can be prepared according to the procedures of the foregoing examples are N-(2-thienylmethylene)-2-methyl-4-chloro-α-chloroacetanilide, N-(2-thienylmethylene)-2-ethyl-4-bromo-α-chloroacetanilide, N-(2-thienylmethylene)-2-propyl-4-fluoro-α-chloroacetanilide, N-(2-thienylmethylene)-2-hexyl-4-iodo-α-chloroacetanilide, N-(4-methyl-2-thienylmethylene)-2,6-dimethyl-α-chloroacetanilide, N-(3-ethyl-2-thienylmethylene)-2,6-diethyl-4-chloro-α-chloroacetanilide, N-(4-propyl-2-thienylmethylene)-2-methyl-6-methoxy-α-chloroacetanilide, N-(2-thienylmethylene)-2-methyl-6-ethoxy-α-chloroacetanilide, N-(2-thienylmethylene)-2-methyl-6-propoxy-α-chloroacetanilide, N-(2-thienylmethylene)-2-methyl-6-hexyloxy-α-chloroacetanilide, N-(2-thienylmethylene)-2,6-diethyl-α-bromoacetanilide, N-(2-thienylmethylene)-2,6-dimethyl-4-fluoro-α-chloropropionanilide, N-(2-thienylmethylene)-2,4,6-trimethyl-α-chlorobutyranilide, N-(2-thienylmethylene)-2,4,6-triethyl-α-bromopropionanilide, N-(2-thienylmethylene)-N-α-chloropentanoyl-2,6-diethylaniline, N-(2-thienylmethylene)-N-α-chlorohexanoyl-2,6-diethylaniline, N-(2-thienylmethylene)-N-α-bromoheptanoyl-2,6-diethylaniline and the like.

For practical use as herbicides the compounds of this invention are generally incorporated into herbicidal compositions which comprise an inert carrier and a herbicidally toxic amount of such a compound. Such herbicidal compositions, which can also be called formulations, enable the active compound to be applied conveniently to the site of the weed infestation in any desired quantity. These compositions can be solids such as dusts, granules, or wettable powders; or they can be liquids such as solutions, aerosols, or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, onto and into granulated carriers such as the attapulgites or the vermiculites, usually of a particle size range of from about 0.3 to 1.5 mm. Wettable powders, which can be dispersed in water or oil to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of herbicides can be dispersed under super-atmospheric pressure as aerosols. However, preferred liquid herbicidal compositions are emulsifiable concentrates, which comprise an active compound according to this invention and as the inert carrier, a solvent and an emulsifier. Such emulsifiable concentrates can be extended with water and/or oil to any desired concentration of active compound for application as sprays to the site of the weed infestation. The emulsifiers most commonly used in these concentrates are nonionic or mixtures of nonionic with anionic surface-active agents. With the use of some emulsifier systems an inverted emulsion (water in oil) can be prepared for direct application to weed infestations.

A typical herbicidal composition according to this invention is illustrated by the following example, in which the quantities are in parts by weight.

EXAMPLE 16

Preparation of a Dust
| | |
|---|---|
| Product of Example 3 | 10 |
| Powdered Talc | 90 |

The above ingredients are mixed in a mechanical grinder-blender and are ground until a homogeneous, free-flowing dust of the desired particle size is obtained. This dust is suitable for direct application to the site of the weed infestation.

The compounds of this invention can be applied as herbicides in any manner recognized by the art. One method for the control of weeds comprises contacting the locus of said weeds with a herbicidal composition comprising an inert carrier and as an essential active ingredient, in a quantity which is herbicidally toxic to said weeds, a compound of the present invention. The concentration of the new compounds of this invention in the herbicidal compositions will vary greatly with the type of formulation and the purpose for which it is designed, but generally the herbicidal compositions will comprise from about 0.05 to about 95 percent by weight of the active compounds of this invention. In a preferred embodiment of this invention, the herbicidal compositions will comprise from about 5 to about 75 percent by weight of the active compound. The compositions can also comprise such additional substances as other pesticides, such as insecticides, nematocides, fungicides, and the like; stabilizers, spreaders, deactivators, adhesives, stickers, fertilizers, activators, synergists, and the like.

The compounds of the present invention are also useful when combined with other herbicides and/or defoliants, dessicants, growth inhibitors, and the like in the herbicidal compositions heretofore described. These other materials can comprise from about 5 to about 95 percent of the active ingredients in the herbicidal compositions. Use of combinations of these other herbicides and/or defoliants, dessicants, etc. with the compounds of the present invention provide herbicidal compositions which are more effective in controlling weeds and often provide results unattainable with separate compositions of the individual herbicides. The other herbicides, defoliants, dessicants and plant growth inhibitors, with which the compounds of this invention can be used in the herbicidal compositions to control weeds, can include chlorophenoxy herbicides such as 2,4-D, 2,4,5-T, MCPA, MCPB, 4(2,4-DB), 2,4-DEB, 4-CPB, 4-CPA, 4-CPP, 2,4,5-TB, 2,4,5-TES, 3,4-DA, silvex and the like; carbamate herbicides such as IPC, CIPC, swep, barban, BCPC, CEPC, CPPC, and the like; thiocarbamate and dithiocarbamate herbicides such as CDEC, metham sodium, EPTC, diallate, PEBC, perbulate, vernolate and the like; substituted urea herbicides such as norea, siduron, dichloral urea, chloroxuron, cycluron, fenuron, monuron, monuron TCA, diuron, linuron, monolinuron, neburon, buturon, trimeturon and the like; symmetrical triazine herbicides such as simazine, chlorazine, atraone, desmetryne, norazine, ipazine, prometryn, atazine, trietazine, simetone, prometone, propazine, ametryne and the like; chloroacetamide herbicides such as 4-(chloroacety)morpholine, 1-(chloroacetyl)piperidine and the like; chlorinated aliphatic acid herbicides such as TCA, dalapon, 2,3-dichloropropionic acid, 2,2,3-TPA and the like; chlorinated benzoic acid and phenylacetic acid herbicides such as 2,3,6-TBA, 2,3,5,6-TBA, dicamba, tricamba, amiben, fenac, PBA, 2-methoxy-3,6-dichlorophenylacetic acid, 3-methoxy- 2,6-dichlorophenylacetic acid, 2-methoxy-3,5,6-trichlorophenylacetic acid, 2,4-dichloro-3-nitrobenzoic acid and the like; and such compounds as aminotriazole, maleic hydrazide, phenyl mercuric acetate, endothal, biuret, technical chlordane, dimethyl 2,3,5,6-tetrachloroterephthalate, diquat, erbon, DNC, DNBP, dichlobenil, DPA, diphenamid, dipropalin, trifluralin, solan, dicryl, merphos, DMPA, DSMA, MSMA, potassium azide, acrolein, benefin, bensulide, AMS, bromacil, 2-(3,4-dichlorophenyl)-4-methyl-1,2,4-oxadiazolidine-3,5-dione, bromoxynil, cacodylic acid, CMA, CPMF, cypromid, DCB, DCPA, dichlone, diphenatril, DMTT, DNAP, EBEP, EXD, HCA, ioxynil, IPX, isocil, potassium cyanate, MAA, MAMA, MCPES, MCPP, MH, molinate, NPA, OCH, paraquat, PCP, picloram, DPA, PCA, pyrichlor, sesone, terbacil, terbutol, TCBA, brominil, CP-50144, H-176-1, H-732, M-2901, planavin, sodium tetraborate, calcium cyanamid, DEF, ethyl xanthogen disulfide, sindone, sindone B, propanil and the like.

Such herbicides can also be used in the methods and compositions of this invention in the form of their salts, esters, amides, and other derivatives whenever applicable to the particular parent compounds.

Weeds are undesirable plants growing where they are not wanted, having no economic value, and interfering with the production of cultivated crops, with the growing of ornamental plants, or with the welfare of livestock. Many types of weeds are known, including annuals such as pigweed, lambsquarters, foxtail, crabgrass, wild mustard, field pennycress, ryegrass, goose grass, chickweed, wild oats, velvetleaf, purslane, barnyardgrass, smartweed, knotweed, cocklebur, wild buckwheat, kochia, medic, corn cockle, ragweed, sowthistle, coffeeweed, croton, cuphea, dodder, fumitory, groundsel, hemp nettle, knawel, spurge, spurry, emex, jungle rice, pondweed, dog fennel, carpetweed, morningglory, bedstraw, ducksalad, naiad, cheatgrass, fall panicum, jimsonweed, witchgrass, switchgrass, watergrass, teaweed, wild turnip and sprangletop; biennials such as wild carrot, matricaria, wild barley, campion, chamomile, burdock, mullein, roundleaved mallow, bull thistle, hounds-tongue, moth mullein and purple star thistle; or perennials such as white cockle, perennial ryegrass, quackgrass, Johnson grass, Canada thistle, hedge bindweed, Bermuda grass, sheep sorrel, curly dock, nutgrass, field chickweed, dandelion, campanula, field bindweed, Russian knapweed, mesquite, toadflax, yarrow, aster, gromwell, horsetail, ironweed, sesbania, bulrush, cattail, wintercress, horsenettle, nutsedge, milkweed and sicklepod.

Similarly, such weeds can be classified as broadleaf or grassy weeds. It is economically desirable to control the growth of such weeds without damaging beneficial plants or livestock.

The new compounds of this invention are particularly valuable for weed control because they are toxic to many species and groups of weeds while they are relavely non-toxic to many beneficial plants. The exact amount of compound required will depend on a variety of factors, including the hardiness of the particular weed species, weather, type of soil, method of application, the kind of beneficial plants in the same area, and the like. Thus, while the application of up to only about one or two ounces of active compound per acre may be sufficient for good control of a light infestation of weeds growing under adverse conditions, the application of ten pounds or more of an active compound per acre may be required for good control of a dense infestation of hardly perennial weeds growing under favorable conditions.

The herbicidal toxicity of the new compounds of this invention can be illustrated by many of the established testing techniques known to the art, such as pre- and post-emergence testing.

The herbicidal activity of the compounds of this invention was demonstrated by experiments carried out for the pre-emergence control of a variety of weeds. In these experiments small plastic greenhouse pots filled with dry soil were seeded with the various weed seeds. Twenty-four hours or less after seeding the pots were sprayed with water until the soil was wet and the test compounds formulated as aqueous emulsions of acetone solutions containing emulsifiers were sprayed at the indicated concentrations on the surface of the soil.

After spraying, the soil containers were placed in the greenhouse and provided with supplementary heat as required and daily or more frequent watering. The plants were maintained under these conditions for a period of from 15 to 21 days, at which time the condition of the plants and the degree of injury to the plants was rated on a scale of from 0 to 10, as follows: 0 = no injury, 1,2 = slight injury, 3,4 = moderate injury, 5,6 = moderately severe injury, 7,8,9 = severe injury and 10 = death. The effectiveness of these compounds is demonstrated by the following data:

TABLE I

| | Injury Rating | | |
|---|---|---|---|
| | Product of Example 3 | Product of Example 6 | |
| Weed Species | Concentration 10 | (lbs/acre) 10 | 2 |
| Yellow Nutsedge | 4 | 10 | 10 |
| Wild Oats | 4 | 7 | 1 |
| Jimsonweed | 2 | 2 | — |
| Velvetleaf | 0 | 0 | — |
| Johnson Grass | 9 | 8 | 8 |
| Pigweed | 8 | 10 | 8 |
| Mustard | 4 | 0 | — |
| Yellow Foxtail | 10 | 10 | 6 |
| Barnyardgrass | 10 | 10 | 9 |
| Crabgrass | 10 | 10 | 8 |
| Cheatgrass | 10 | 6 | 0 |
| Morningglory | 4 | 0 | — |

The herbicidal activity of the compounds of this invention was also demonstrated by experiments carried out for the post-emergence control of a variety of weeds. In these experiments the compounds to be tested were formulated as aqueous emulsions and sprayed at the indicated dosage on the foliage of the weeds that have attained a prescribed size. After spraying the plants were placed in a greenhouse and watered daily or more frequently. Water was not applied to the foliage of the treated plants. The severity of the injury was determined 10 to 15 days after treatment and was rated on the scale of from 0 to 10 heretofore described. The effectiveness of these compounds is demonstrated by the following data:

TABLE II

| | Injury Rating | | |
|---|---|---|---|
| | Product of Example 3 | Product of Example 6 | |
| Weed Species | Concentration 10 | (lbs/acre) 10 | 2 |
| Yellow Nutsedge | 8 | 2 | 0 |
| Wild Oats | 3 | 7 | 1 |
| Jimsonweed | 6 | 3 | — |
| Johnson Grass | 5 | 6 | 6 |
| Pigweed | 4 | 4 | 4 |
| Mustard | 4 | 3 | — |
| Yellow Foxtail | 7 | 9 | 4 |
| Barnyardgrass | 9 | 9 | 6 |
| Crabgrass | 6 | 3 | 5 |
| Morningglory | 4 | 3 | — |
| Bindweed | 0 | 1 | — |
| Cheatgrass | — | — | 1 |

We claim:
1. A compound of the formula

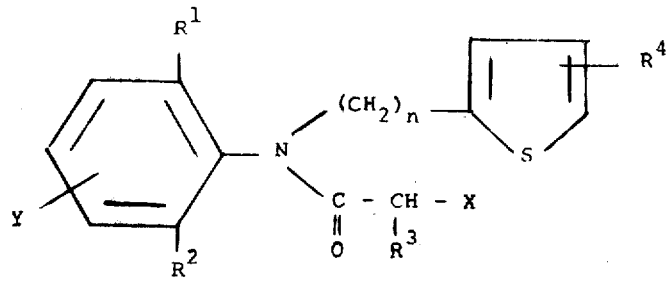

wherein $R^1$ is lower alkyl; $R^2$ is selected from the group consisting of hydrogen, lower alkyl and lower alkoxy; Y is selected from the group consisting of hydrogen, lower alkyl and halogen; $R^3$ and $R^4$ are independently selected from the group consisting of hydrogen and lower alkyl; $n$ is the integer 1 or 2; and X is halogen.

2. The compound of claim 1, N-(2-thienylmethylene)-2,6-dimethyl-α-chloroacetanilide.

3. The compound of claim 1, N-(2-thienylmethylene)-2,6-diethyl-α-chloroacetanilide.

4. The compound of claim 1, N-(2-thienylmethylene)-2-methyl-5-α-dichloroacetanilide.

5. The compound of claim 1, N-(2-thienylmethylene)-N-α-chloropropionyl-2-methylaniline.

6. The compound of claim 1, N-(2-thienylethylene)-2,6-diethyl-α-bromoacetanilide.

* * * * *